United States Patent [19]
Satoh et al.

[11] Patent Number: 5,345,283
[45] Date of Patent: Sep. 6, 1994

[54] LENS BARREL

[75] Inventors: Kazuhiro Satoh, Sagamihara; Minoru Hara, Hachioji; Eiji Otsuka, Minowa, all of Japan

[73] Assignee: Olympus Optical Co. Ltd., Tokyo, Japan

[21] Appl. No.: 998,825

[22] Filed: Dec. 30, 1992

[30] Foreign Application Priority Data

Jan. 7, 1992 [JP] Japan .................. 4-001031

[51] Int. Cl.⁵ .................................. G03B 17/24
[52] U.S. Cl. .................................. 354/106
[58] Field of Search ............. 354/105, 106, 109, 195.1, 354/195.11, 195.12, 400

[56] References Cited

U.S. PATENT DOCUMENTS

| Re. 30,258 | 4/1980 | Fujita | 354/106 |
|---|---|---|---|
| 4,165,933 | 8/1979 | Sonouchi et al. | 354/106 |
| 4,179,203 | 12/1979 | Hirohata et al. | 354/106 |
| 4,312,581 | 1/1982 | Miyagawa et al. | 354/106 |
| 4,362,369 | 12/1982 | Kazami et al. | 354/106 |
| 5,014,077 | 5/1991 | Yomogizawa et al. | 354/187 |

FOREIGN PATENT DOCUMENTS 55-101930 8/1980 Japan .

Primary Examiner—Michael L. Gellner
Assistant Examiner—Nicholas J. Tuccillo
Attorney, Agent, or Firm—Louis Weinstein

[57] ABSTRACT

A lens barrel according to the invention comprises a fixed tube fixedly mounted on a camera body, a drive tube fitted with respect to the fixed tube, a data projector fixedly mounted on the camera body for radiating a projecting luminous flux toward a film surface from respective outer peripheries of the fixed tube and the drive tube, to project photographing information, a through bore formed through a portion of the fixed tube through which the projecting luminous flux of the data projecting means passes, and a cut-out provided in a portion of the drive tube which is overlapped with the through bore in the fixed tube upon photographing. Upon non-photographing, a portion of the drive tube having no cut-out shields the through bore in the fixed tube.

24 Claims, 6 Drawing Sheets

LENS BARREL

BACKGROUND OF THE INVENTION

1. Field of the Invention

The present invention relates to lens barrels and, more particularly, to a lens barrel in which it has a data projecting mechanism within a camera body, and photographing information is projected onto a film surface through a portion of the lens barrel.

2. Related Art And Prior Art Statement

A camera has been known in which desired photographing information data such as a photographing date and the like can be projected onto a film surface. Almost all of the conventional cameras each having a data projecting mechanism is arranged such that a rear lid or closure of the camera is provided therein with the data projecting mechanism, and data can be projected from the side of a rear surface of an emulsion of the film.

However, if the data projecting mechanism is arranged within the rear closure of the camera to project the data from the side of the rear surface of the film in this manner, there are the following problems and the like:

1) Thickness of the rear closure of the camera increases so that the camera is large-sized. Thus, portability and holding ability are reduced.
2) Because of giving and receiving of an electric signal between a data projecting unit arranged within the rear closure of the camera and a CPU arranged within the camera body, an electric connection between the data projecting unit and the CPU is required. For this reason, a structure or construction is complicated.

Accordingly, in order to solve the above-discussed problem, it is preferable to take an arrangement in which the data projecting mechanism is arranged adjacent to the camera body, and data can be projected from the side of a front surface of the film. If the camera is arranged in this manner, however, in the camera body having no space, the data projecting mechanism is arranged above a portion within the camera body. Then, in a case of a drum-sinking camera or the like, rear portions of respective stationary or fixed tube and a rotary drive tube in the lens barrel are necessarily interposed between the data projecting mechanism and the film, to interrupt a ray of light for date projection. Accordingly, in order to lead the ray of light for date projection onto the film surface, bores must be provided which causes the ray of light for date projection to pass, at rear portions of the respective fixed tube and rotary drive tube.

However, if the bores are provided, even in a non-photographing condition such as an unused condition of the camera, the bores provided in the rear portions of the respective fixed tube and rotary drive tube are always under a condition being opened. Accordingly, although the bores are anyhow covered by the data projecting mechanism, there are no other interrupting objects or items. Thus, there is a fear that, under a non-use condition and a conservation condition for a long period of time, an outward light approaches so that light leakage occurs, and the film is exposed.

OBJECTS AND SUMMARY OF THE INVENTION

It is an object of the invention to provide a lens barrel for a camera which is arranged such that data projecting means is provided adjacent to a camera body, and data are projected from a side of a front surface of a film, wherein the film is not exposed by unnecessary light through an optical passage for the projection.

Briefly, a lens barrel according to the invention is provided, in a camera having data projecting means for projecting data from the side of a front surface of a film, with interrupting means for selectively interrupting an optical passage for the projection.

These objects and advantages of the present invention will become further apparent from the following detailed explanation.

DETAILED DESCRIPTION OF THE PREFERRED EMBODIMENT

An embodiment of the invention will hereunder be described with reference to the drawings.

Figure 1:
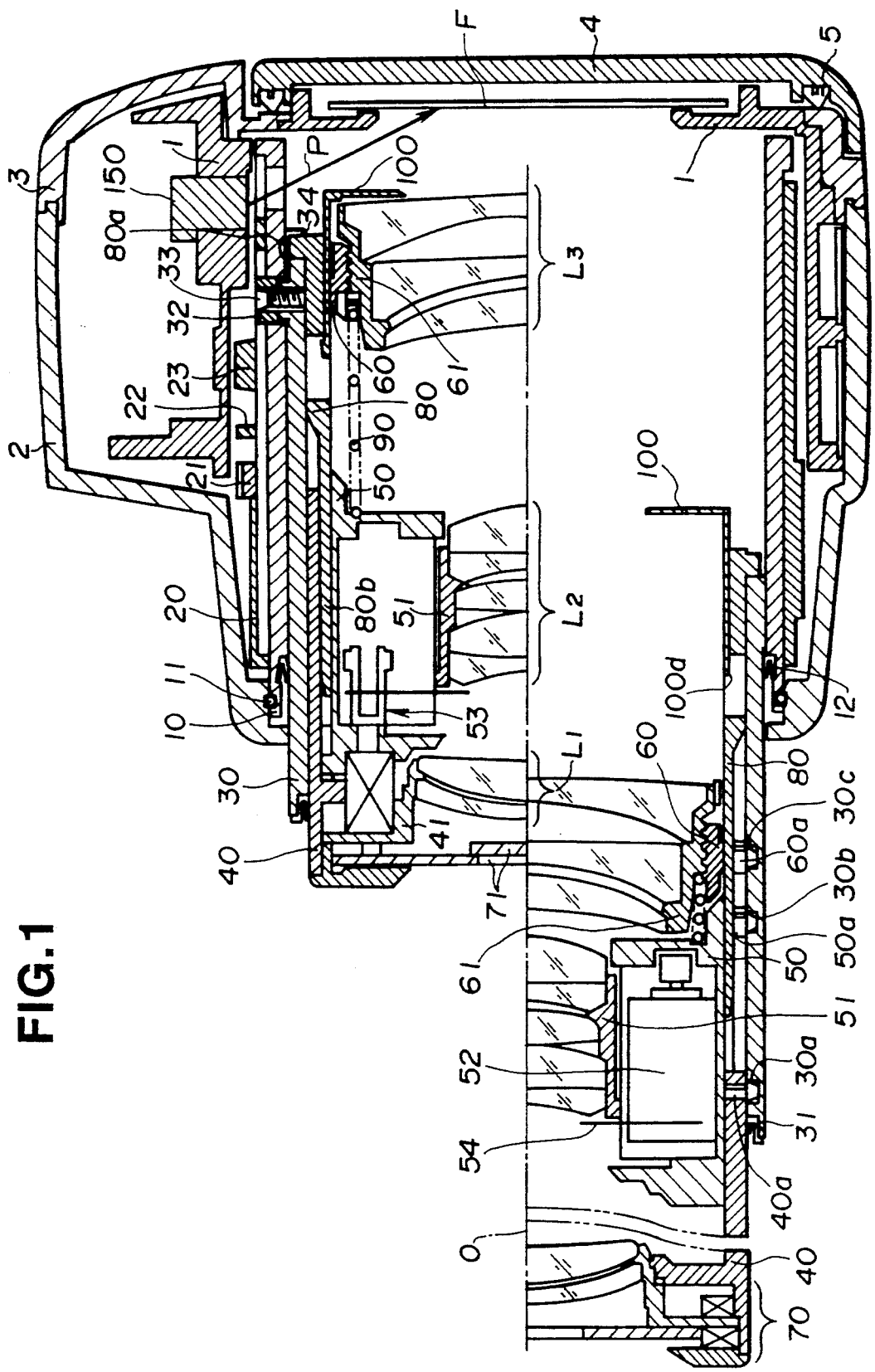
FIG. 1 is a cross-sectional view of a lens barrel showing an embodiment of the invention.
Figure 2:
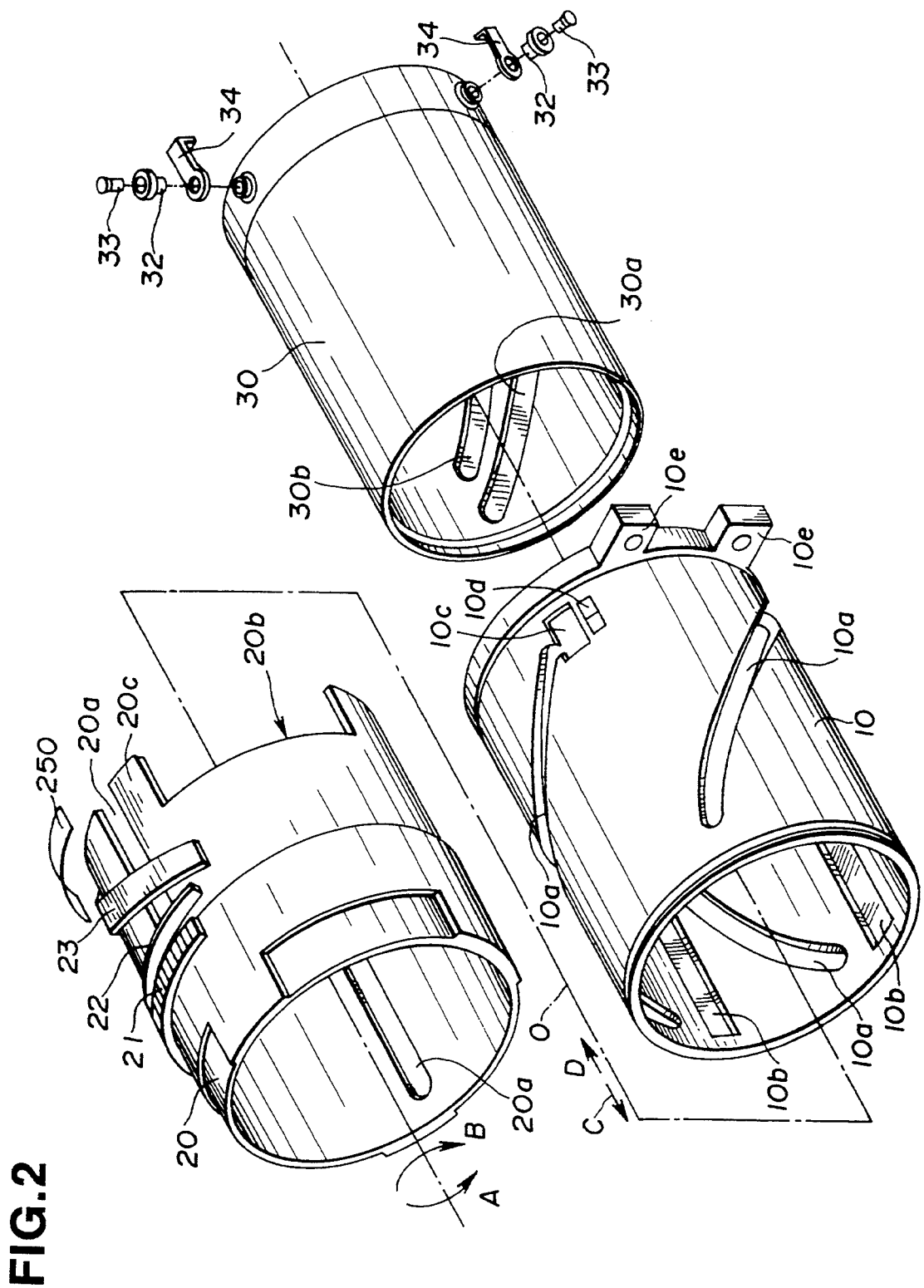
FIG. 2 is an exploded perspective view showing various constitutional elements of the lens barrel under a condition extended in an optical-axis direction.
Figure 3:
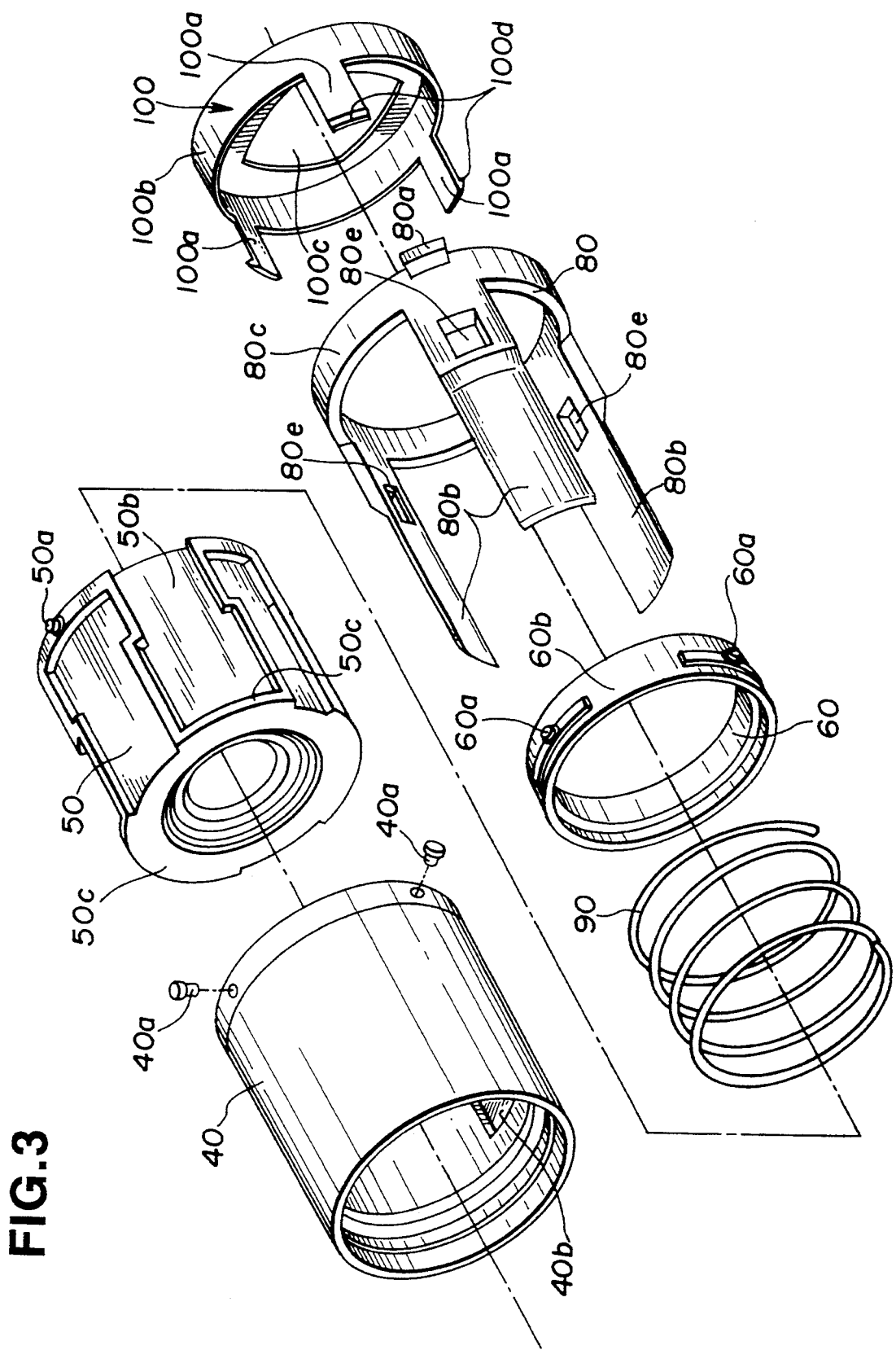
FIG. 3 is an exploded perspective view showing various constitutional elements of the lens barrel under a condition extended in the optical-axis direction.

FIG. 1 is a cross-sectional view of a principal portion of a camera which has a lens barrel, showing an embodiment of the invention. FIGS. 2 and 3 are exploded perspective views showing various elements forming or constituting the lens barrel in a manner elongated in an optical-axis direction.

The embodiment is arranged such that the invention is applied to a zoom lens barrel. The zoom lens barrel is so arranged as to include a fixed tube 10 which is integrally mounted on a camera body 1. The zoom lens barrel has an upper half portion in FIG. 1, which shows a condition under which the zoom lens is moved to a WIDE position, and a lower half portion which shows a condition under which the zoom lens is moved to a TELE position.

The camera having the lens barrel has a principal portion thereof which is so arranged as to comprise a front cover 2 for covering a front portion of the camera body 1 and a rear cover 3 for covering a rear portion of the camera body 1, and a rear lid or closure 4. In this connection, the rear closure 4 which is mounted on the rear cover 3 by a hinge (not shown) for opening and closing is closed by the closure in a light-tight manner by a light-interrupting elastic element 5.

The zoom lens barrel comprises a drive tube 20 fitted about an outer peripheral surface of the fixed tube 10 for angular movement, for being obstructed or impeded against movement in the optical-axis direction, a cam tube 30 fitted about an inner peripheral surface of the fixed tube 10 and driven by the drive tube 20 for forward and rearward movement in the optical-axis direction while being moved angularly, a first lens tube 40, a second lens tube 50 and a third lens tube 60 arranged within the cam tube 30 in order from the front thereof for forward and rearward movement in the optical-axis direction, a float key 80 arranged within the cam tube 30 and obstructed against movement in the optical-axis direction by a key receipt element 34 and obstructed against angular movement about the optical axis by the fixed tube 10 for controlling or regulating angular movement of the first lens tube 40, the second lens tube 50 and the third lens tube 60 about the optical axis, a barrier unit 70 (refer to FIG. 1) arranged adjacent to a front surface of the first lens tube 40 in which barriers 71 are opened and closed by a barrier driver 53 (refer to FIG. 1) supported within the second lens tube 50, a shutter vane or blade 54 (refer to FIG. 1) opened and closed by a shutter unit 52 (refer to FIG. 1) supported within the second lens tube 50, an elastic element 90 arranged so as to be in tension between the second lens tube 50 and the third lens tube 60 and composed of a coil spring for absorbing rattle or backlash of fitting between a pair of drive rollers 50a and 60a with respect to a pair of cam slots 30b and 30c to be described later, and a flare diaphragm 100 mounted on a rear portion of the float key 80. The drive tube 20 is arranged such that a drive gear 21, a guide rib 22 and an interlocking cam 23 formed on the outer peripheral surface of the drive tube 20 in a partial arcuate form are arranged in order from the front portion thereof. The drive gear 21 receives a drive force from a zoom drive unit (not shown) to guide the drive tube 20 along the guide rib 22, to thereby angularly move the drive tube 20 about an optical axis O in a counterclockwise direction (arrow A) or in a clockwise direction (arrow B). Moreover, the interlocking cam 23 serves to zoom the lens of a finder optical system (not shown). The drive tube 20 is provided with a plurality of guide slots 20a which are located respectively at trisected locations in a peripheral direction of the drive tube 20 in the optical-axis direction. Additionally, a cut-out 20b for causing a date projecting luminous flux from a data unit 150 (refer to FIG. 5) to be described later, to pass is formed at rearward edges of the respective guide elongated slots 20a. Furthermore, an encoder 250 for detecting an angular movement quantity of the drive tube 20 is arranged at the rearward edge of the drive tube 20.

Figure 4:
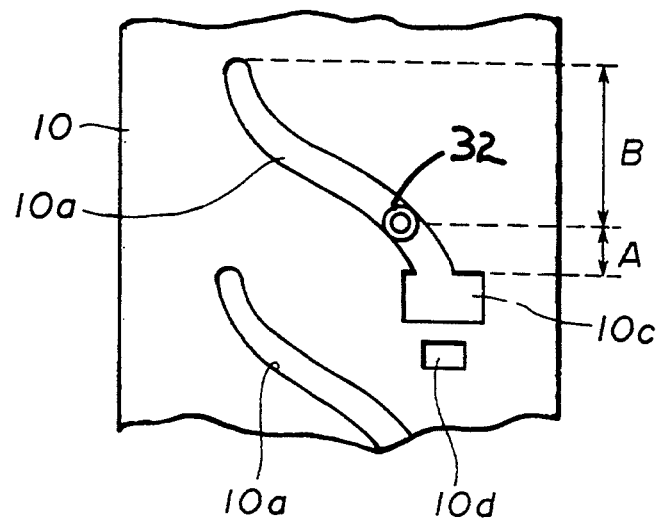
FIG. 4 is a top-plan developed view of cam slots in a fixed tube.
Figure 7:
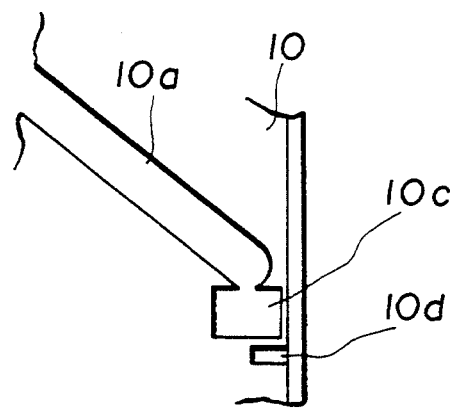
FIG. 7 is a top plan view of a principal portion of the fixed tube, showing the through bore for date projection, which is formed in the fixed tube.

The fixed tube 10 is arranged such that a plurality of cam grooves 10a in the form of a lead for moving the cam tube 30 forwardly and rearwardly in the optical-axis direction while the cam tube 30 is rotated are formed respectively at trisected positions of the peripheral surface of the circumferential fixed tube 10, and that a plurality of rectilinear guide grooves 10b into which guide projections 80a of the float key 80 to be described later are fitted respectively are formed in the fixed tube 10 respectively at trisected portions in the peripheral direction of the inner peripheral surface of the fixed tube 10. As shown in FIG. 2 and FIG. 7, a plurality of through bores 10c each in the form of a rectangle elongated in the optical-axis direction are formed in the rearward end portion of the fixed tube 10 opposed against the side of the film surface adjacent to the terminal end of the cam groove 10a, which is located at an upper portion of the camera. The through bores 10c are formed such that the cut-outs 20b in the drive tube 20 are overlapped respectively with the through bores 10c upon photographing, and serves to cause the date projecting luminous flux from the data unit 150 (refer to FIG. 5) that is data projecting means, to pass toward the film surface. Moreover, stop projections 10d for regulating angular movement of the drive tube 20 are formed in an outer peripheral surface thereof at a location on the through bores 10c opposite to the terminal end of the cam tube 10a. Here, the cam tube 10 is arranged as shown in FIG. 4 when developed in plan, and rollers 32 of the cam tube 30 are so arranged as to be moved between a first region A where the lens system is drum-sunk and a second region B where the lens system effects zoom operation, by the drive tube 20. In this connection, a pair of projecting pieces 10e so formed as to project radially on a rearward edge of the fixed tube 10 are mounting portions on the camera body 1.

Returning to FIGS. 1, 2 and 3, the cam tube 30 fitted in the inner peripheral surface of the fixed tube 10 is formed with cam grooves 30a for zooming-moving the first lens tube 40 in the optical-axis direction, on the inner peripheral surface of the cam tube 30 at trisected positions, respectively. Similarly, a plurality of cam grooves 30b for zooming-moving the second lens tube 50 in the optical-axis direction and a plurality of cam grooves 30c for zooming-moving the third lens tube 60 in the optical-axis direction are formed respectively at the trisected positions of the inner peripheral surface. The plurality of zooming drive rollers 32 are fixedly mounted respectively on the trisected positions of the outer peripheral surface of the rearward edge by screws 33. These rollers 32 pass respectively through the cam groove 10a in the fixed tube 10 and are fitted within the guide elongated groove 20a in the drive tube 20. Accordingly, when the drive tube 20 is moved angularly about the optical axis O, the zooming drive rollers 32 are also moved angularly by the guide elongated tube 20a. Thus, the cam tube 30 is moved forwardly and rearwardly in the optical-axis direction while being moved angularly by the cam groove 10a.

The first lens tube 40 is arranged such that a lens supporting frame 41 holding or retaining a first group of lenses L1 (refer to FIG. 1) is fixedly mounted on a portion within the first lens tube 40 adjacent to the front portion thereof. A plurality of guide grooves 40b relatively wide in width and extending in the optical-axis direction are formed respectively at the trisected positions on the inner peripheral surface of the first lens tube 40. Thus, a portion of each of key portions 80b on the float key 80 to be described later adjacent to an outer surface thereof is fitted in the guide groove 40b, and is regulated such that the lens tube 40 is moved only in the optical-axis direction. Furthermore, a plurality of drive rollers 40a are fixedly mounted respectively at trisected positions on the outer peripheral surface of the rearward end of the lens tube 40 so that the drive rollers 40a are fitted respectively in the cam grooves 30a in the cam tube 30.

The second lens tube 50 is arranged such that a lens supporting frame 51 retaining a second group of lenses L2 (refer to FIG. 1) is fixedly mounted on an interior of the second lens tube 50. A plurality of guide recesses 50b in the optical-axis direction, which have respective front end walls 50c, which are relatively wide in circumferential width peripherally and which have respective open rearward portions thereof are provided respectively at the trisected positions of the outer peripheral surface of the second lens tube 50. The key portions 80b of the float key 80 fitted respectively in the guide grooves 40b have respective portions thereof adjacent to an inner surface thereof which are fitted respectively in the guide recesses 50b so that the lens tube 50 is so regulated as to be moved only in the optical-axis direction. Accordingly, the key portions 80b of the float key 80 are in the form of being put between the guide grooves 40b and the guide recesses 50b. Further, the drive rollers 50a are fixedly mounted on a rearward portion between the guide recesses 50b in the outer peripheral surface. Accordingly, the drive rollers 50a are fixedly mounted respectively on trisected positions of the outer peripheral surface of the rearward end of the lens tube 50, and the drive rollers 50a are fitted respectively in the cam grooves 30b in the cam tube 30.

In connection with the above, the shutter unit 52 and the shutter blade 54 are arranged on the second lens tube 50, as described previously, so that the shutter unit 52 and the shutter blade 54 are moved forwardly and rearwardly together with the second lens tube 50.

The third lens tube 60 is arranged such that a lens holding frame 61 holding a third group of lenses L3 (refer to FIG. 1) is fixedly mounted within the third lens tube 60, and guide cut-outs 60b relatively wide in width extending in a circumferential peripheral direction are provided respectively at the trisected positions on the outer peripheral surface of the third lens tube 60. The key portions 80b of the float key 80 interposed respectively between the guide grooves 40b and the guide recesses 50b are fitted respectively in the guide cut-out 60b so that the lens tube 60 is so restricted as to be moved only in the optical-axis direction. Moreover, the plurality of drive rollers 60a are fixedly mounted respectively between the guide cut-outs 60b in the outer peripheral surface of the lens tube 60. Accordingly, the drive rollers 60a are fixedly mounted respectively at the trisected positions of the outer peripheral surface of the lens tube 60. The drive rollers 60a are fitted respectively in the cam grooves 30c in the cam tube 30.

The resilient or elastic element 90 composed of a coil spring for absorbing rattle or backlash upon fitting of the drive roller 60a fitted in the cam groove 30c and the drive roller 50a fitted in the cam groove 30b is provided in tension between the front end surface of the third lens tube 60 and the rearward end surface of the second lens tube 50.

Furthermore, the float key 80 is formed by an annular proximal end 80c having a front portion thereof located in the inner periphery of the rearward end of the cam tube 30, the three (3) key portions 80b extending forwardly respectively from the trisected positions at the front surface of the float key 80, fitting bores 80e each of a rectangular configuration elongated in the optical-axis direction formed respectively at locations on the respective key portions 80b adjacent to the annular proximal end 80c, and a plurality of guide projections 80a provided in projection respectively at trisected positions of the outer peripheral surface of the annular proximal portions 80c and fitted respectively in the rectilinear guide grooves 10b in the fixed tube 10. The float key 80 is arranged such that, when the zooming drive rollers 32 are fixedly mounted respectively on the trisected positions on the outer peripheral surface of the rearward edge of the cam tube 30 by the screws 33, the rearward end surface of the annular proximal portion 80c is simultaneously received by key receipt elements 34 fixed by the screws 33, whereby, although the float key 80 is moved in the optical-axis direction together with the cam tube 30, the guide projections 80a are fitted respectively in the rectilinear guide grooves 10b in the fixed tube 10 whereby angular movement about the optical axis O is prevented from occurring. The three key portions 80b extending forwardly are inserted respectively through the guide cut-outs 60b in the third lens tube 60, the guide recesses 50b in the second lens tube 50 and the guide grooves 40b in the first lens tube 40.

The flare diaphragm 100 comprises an annular peripheral wall portion 100b so formed as to be directed forwardly on the outer peripheral portion of a thin disc having a central portion formed therethrough with a flare diaphragm opening 100c, a plurality of mounting pieces 100a having elasticity and extending forwardly respectively from the trisected positions at the front surface of the annular peripheral wall portion 100b, and a plurality of engaging pawls 100d formed on the outer peripheral surface respectively at the forward ends of the respective mounting pieces 100a. The flare diaphragm 100 is fitted in the inner peripheral surface of the float key 80 from the rearward position thereof so as not to interfere with the third lens tube 60, and the engaging pawls 100d of the mounting piece 100a are elastically fitted respectively in the rectangular fitting bores 80e in the float key 80, whereby the flare diaphragm 100 is mounted on the rearward portion of the float key 80 so as to be capable of being moved in the optical-axis direction by a length of the fitting bores 80e.

In connection with the above, an O-ring 11 is arranged for light-tightly and liquid-tightly holding a location between the inner peripheral surface of the front end portion of the front cover 2 and the outer peripheral surface of the front end portion of the fixed tube 10, as shown in FIG. 1. Furthermore, elastic rings 12 and 31 for holding optical tightness and light tightness are arranged respectively between the inner peripheral surface of the fixed tube 10 adjacent to the forward end thereof and the outer peripheral surface of the cam tube 30 and between the front end surface of the cam tube 30 and the outer peripheral surface of the first lens tube 40.

Figure 5:
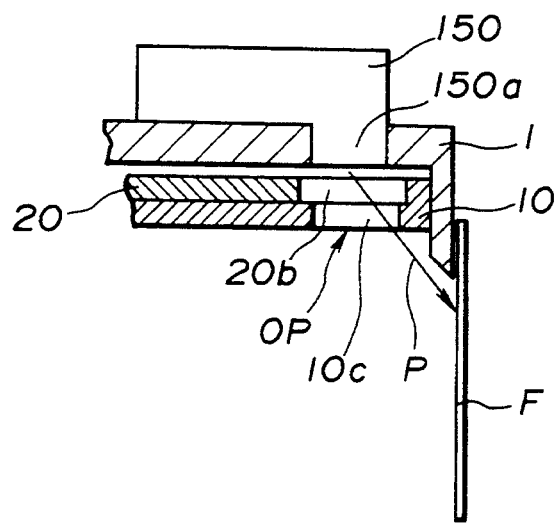
FIG. 5 is an enlarged cross-sectional view of a principal portion showing a data unit and a date projecting luminous flux P.

As shown in FIG. 5, the data unit 150 for projecting data onto the film surface from the forward location is fixedly mounted onto the camera body 1 within the space between the front cover 2 and the rear cover 3, and the camera body 1. A date projecting luminous flux P from a light emitting portion 150a of the data unit 150 passes through an opening OP formed by overlapping alignment between the cut-out portion 20b in the drive tube 20 and the through bore 10c in the fixed tube 10, and reaches the front surface of the film F, under a normal photographable condition.

Figure 6:
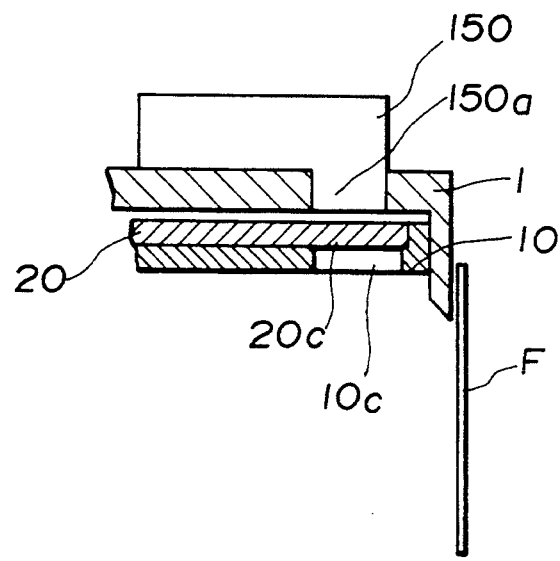
FIG. 6 is an enlarged cross-sectional view of a principal portion of FIG. 5 showing a condition under which a light interrupting piece of a drive tube covers a through bore in the fixed tube in a drum-sinking condition position.
Figure 8:
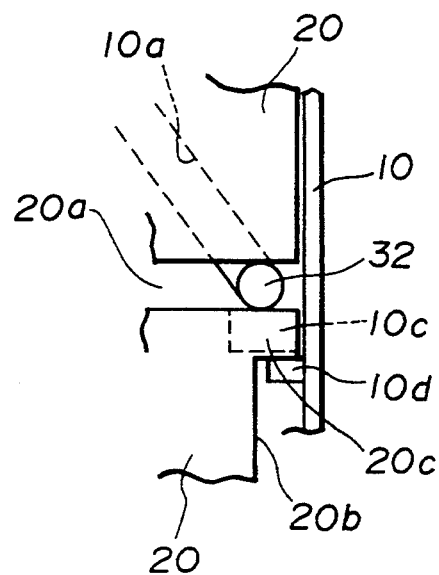
FIG. 8 is a top plan view of a principal portion, showing a condition under which the light interrupting piece of the drive tube closes the through bore for date projection in the fixed tube.

Operation of the zoom lens barrel and the data unit 150 arranged described above will next be described. First, in the drum-sinking condition position in which the lens barrel is moved further rearwardly from the WIDE position of the zoom lens barrel illustrated in the upper half portion of FIG. 1 so that the lens barrel approaches an aperture window in the camera body 1, the drive tube 20 is in the terminate position where the drive tube 20 is moved angularly about the optical axis O in the clockwise direction B (refer to FIG. 1). Accordingly, as shown in FIG. 8, one of the inner edges of the respective cut-outs 20b is abutted against the stop projection 10d of the fixed tube 10, and an interrupting piece 20c formed between the cut-out 20b and the guide elongated groove 20a covers the through bore 10c in the fixed tube 10 (refer to FIG. 6). Accordingly, in this drum-sinking condition position, the cut-out 20b in the drive tube 20 is not in overlapped alignment with the through bore 10c in the fixed tube 10, but the opening OP (refer to FIG. 5) is closed. Thus, even if the light emitting portion 150a of the data unit 150 (refer to FIGS. 5 and 6) that is data projecting means radiates or emits light erroneously, the data projecting luminous flux P does not reach the front surface of the film F. Moreover, the interrupting piece 20c covers the through bore 10c in the fixed tube 10, whereby it is possible as far as practical to prevent an outward light from passing through the through bore 10c so that the surface of the film F is exposed.

Figure 9:
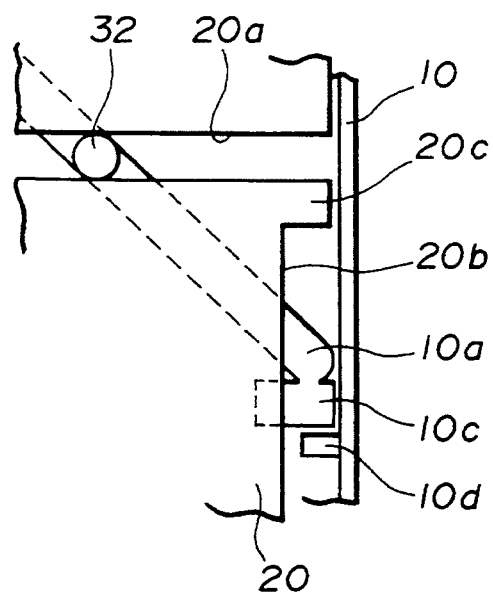
FIG. 9 is a top plan view of a principal portion, showing a condition under which a cut-out in the drive tube is in alignment with the through bore for date projection in the fixed tube so that the through bore is opened.

Subsequently, when the drive tube 20 is moved angularly about the optical axis O in the counterclockwise direction A in subject to driving of a zoom drive unit (not shown), the zoom drive rollers 32 fitted in the guide elongated tube 20a is also moved angularly in the counterclockwise direction A. Accordingly, the cam tube 30 is guided by the cam tube 10a in the fixed tube 10 and is moved forwardly in the optical-axis direction while being rotated. At this time, the float key 80 is moved only in the optical-axis direction. By the operation of the cam tube 30 and the float key 80, the first lens tube 40, the second lens tube 50 and the third lens tube 60 are guided respectively by the cam grooves 30a, 30b and 30c, and are moved such that the first lens tube 40, the second lens tube 50 and the third lens tube 60 are brought to respective predetermined focal lengths thereof in the optical-axis direction. The first lens tube 40, the second lens tube 50 and the third lens tube 60 reach the WIDE condition positions from the drum-sinking condition position illustrated in the upper half portion in FIG. 1. When reaching the WIDE condition position, the third lens tube 60 is at least moved toward a subject by a predetermined distance from the film surface, as shown in FIG. 1. As shown in FIG. 9, the interrupting piece 20c of the drive tube 20 is moved peripherally from a position on the through bore 10c in the fixed tube 10. Accordingly, the through bore 10c is overlapped and aligned with the cut-out 20b so that the opening OP is formed. The date projecting luminous flux P can reach the front surface of the film F. If the light emitting portion 150a of the data unit 150 emits light, it is possible to project desirable date information onto the film surface.

The data projecting condition is retained till a condition in which the drive tube 20 is further moved angularly in the counterclockwise direction A so that the zoom lens barrel is displaced to a TELE condition illustrated in the lower half portion in FIG. 1. Accordingly, it is possible to effect the data projection during the photographing condition.

When the zoom drive tube next moves the drive tube 20 angularly in the clockwise direction B about the optical axis, lens tubes 40, 50 and 60 are moved reversely upon the angular movement in the counterclockwise direction A. Finally, the groups of lenses are moved to the drum-sinking condition position. Accordingly, since the interrupting piece 20c covers the through bore 10c in the fixed tube 10 in the drum-sinking position as described previously, the date projecting luminous flux P and the external light do not pass through the through bore 10c so that the surface of the film F is not exposed to light.

In this invention, it is apparent that working modes different in a wide range can be formed on this basis of this invention without departing from the spirit and scope of the invention. This invention is not restricted by any specific embodiment expect as being limited by the appended claims.

What is claimed

1. A camera comprising:
    a fixed tube fixedly mounted on a camera body;
    a drive tube retained on an outer periphery of said fixed tube for angular movement, said drive tube being moved angularly between a first region where said drive tube effects a drum sinking operation in which a lens barrel is caused to be drawn into the camera body upon non-photographing and a second region where said lens barrel is moved to a desired photographing position upon photographing;
    data projecting means fixedly mounted on said camera body at a location outside of said fixed tube and said drive tube, for projecting a data luminous flux toward a surface of a film loaded on said camera body through said fixed tube and said drive tube;
    a through bore provided at a portion of said fixed tube, through which said data luminous flux passes; and
    a luminous-flux passage control section provided on said drive tube such that said through bore in said fixed tube is shielded by Said Control section when said drive tube is in said first region, and said through bore is opened when said drive tube is in said second region.

2. A camera according to claim 1, wherein said luminous-flux passage control section includes:
    a cut-out provided in said drive tube so as to be opposed against said through bore; and
    a light shielding piece provided adjacent to said cut-out.

3. A camera according to claim 1, wherein said fixed tube is provided with a cam groove for cooperating with said drive tube to move a lens forwardly and rearwardly, and wherein said through bore is arranged adjacent to said cam groove.

4. A camera according to claim 1, wherein said fixed tube is further provided with a stopper for regulating an angularly moving range of said drive tube, at a location adjacent to said through bore.

5. A camera comprising:
    a fixed tube fixedly mounted on a camera body;
    a lens drive tube retained on an outer periphery of said fixed tube for angular movement, said lens drive tube having, at a part thereof, a cut-out;
    data projecting means fixedly mounted on said camera body at a location on the outside of said fixed tube and a lens drive tube, for irradiating a data luminous flux toward the surface of a film loaded on said camera body, through said fixed tube and said drive tube; and
    a through bore provided at a portion of said fixed tube, through which said data luminous flux passes, wherein said cut-out is opposed selectively against the through bore in said fixed tube in accordance with a position of said fixed tube.

6. A camera comprising:
a fixed element fixedly mounted on a camera body;
a lens drive element retained on said fixed element for movement, and moved to positions different from each other upon non-photographing and upon photographing;
data projecting means fixedly mounted on the camera body at a location outside of said fixed element and said drive element, for irradiating a data luminous flux through said fixed element and said drive element;
a light-transmitting portion provided on a portion of said fixed element through which said data luminous flux passes; and
a shielding element arranged on said drive element, for selectively shielding an optical path of said data luminous flux.

7. A lens barrel comprising:
a fixed tube fixedly mounted on a camera body;
a drive tube fitted with respect to said fixed tube;
data projecting means fixedly mounted on said camera body, for irradiating a projecting luminous flux toward a film surface from respective outer peripheries of said fixed tube and said drive tube, to project photographing information;
a through bore formed through a portion of said fixed tube, through which the data projecting luminous flux passes; and
a cut-out provided in a portion of said drive tube, which is overlapped with said through bore in said fixed tube in a photographing mode, and
wherein a portion of said drive tube having no cut-out shields said through bore in said fixed tube in a non-photographing mode.

8. A lens barrel comprising:
a fixed tube fixedly mounted on a camera body;
a drive tube fitted with respect to said fixed tube;
data projecting means fixedly mounted on said camera body, for irradiating a projecting luminous flux toward a film surface from respective outer peripheries of said fixed tube and said drive tube, to project photographing information;
a through bore formed through a portion of said fixed tube, through which the data projecting luminous flux passes;
a cut-out provided in a portion of said drive tube, which is overlapped with said through bore in said fixed tube upon photographing; and
a stopper element provided on said fixed tube, and abutted against a side of said cut-out when said drive tube is moved angularly through a predetermined quantity,
wherein said stopper element is arranged adjacent to said through bore, and wherein, under a condition where said stopper element rotation of said drive tube, a plate-like portion contiguous to the side of said cut-out abutted against said stopper of said drive tube shields said through bore.

9. A lens barrel comprising:
a fixed tube fixedly mounted on a camera body;
a drive tube fitted with respect to said fixed tube;
data projecting means fixedly mounted on said camera body, for irradiating a projecting luminous flux toward a film surface from respective outer peripheries of said fixed tube and said drive tube, to project photographing information;
a through bore formed through a portion of said fixed tube, through which the data projecting luminous flux passes; and
a stopper element provided on said fixed tube,
wherein said drive tube has an engaging projecting piece engaged with said stopper element, wherein said stopper element of said fixed tube and said engaging projecting piece are under a non-engaged condition upon a condition capable of photographing, wherein said through bore in said fixed tube is arranged such that the luminous flux of said data projecting means is capable of passing through said through bore, wherein, upon a non-photographing condition, said engaging projecting piece of said drive tube is engaged by said stopper element of said fixed tube, and wherein said engaging projecting piece shields said through bore.

10. A lens barrel comprising:
a fixed tube fixedly mounted on a camera body;
a drive tube fitted with respect to said fixed tube;
data projecting means fixedly mounted on said camera body, for irradiating a projecting luminous flux toward a film surface from respective outer peripheries of said fixed tube and said drive tube to project photographing information;
a through bore formed through a portion of said fixed tube, through which the data projecting luminous flux passes; and
a cut-out provided in said drive tube,
wherein, upon a photographing condition, said through bore and said cut-out are under a condition overlapped with each other, wherein, upon a non-photographing condition, said through bore is not overlapped with said cut-out, wherein the luminous flux from said data projecting means passes through said drive tube and said fixed tube so as to reach a film surface upon a photographing condition, and wherein, upon a non-photographing condition, said through bore in said fixed tube is shielded by said drive tube.

11. A camera having a projecting function, comprising:
projecting means arranged on the outside of a photographing optical system, for projecting projection data onto a sensitive surface of a film;
a fixed frame having a through bore for leading light projected from said projecting means to a location within said fixed frame; and
lens driving means for cooperating with said fixed frame to drive said lens system of said photographing optical system, and having an opening portion for causing said through bore to open under a photographing condition, and a block portion for blocking said through bore,
whereby, under a non-photographing condition, said through bore and said block portion are overlapped with each other, and unnecessary light is interrupted, and, under the non-photographing condition, said through bore and said opening portion are overlapped with each other, to cause light from said projecting means to reach a location on the film through said through bore.

12. A camera according to claim 11, wherein said lens drive means has cam means for driving said lens in an optical-axis direction.

13. A camera according to claim 11, wherein said non-photographing condition is a drum sinking condition.

14. A camera having a projecting function, comprising:
a photographing optical system movable between a photographing position and a non-photographing position;
optical frame means for separating a photographing optical path of said photographing optical system and an outside of said optical path from each other and having, at a portion thereof, a transparent bore for communicating said optical path and an outside of said optical path with each other, said optical frame means having an opening and closing element for opening and closing said bore wherein, under the photographing position of said photographing optical system, said opening and closing element opens said transparent bore, while, under the non-photographing position of said photographing optical system, said opening and closing element closes said transparent bore; and
data projecting means arranged on an outer side of the photographing optical path of said optical frame means, for projecting information through said bore when said bore is open.

15. A camera according to claim 14, wherein said photographing optical system has focal-length changing means.

16. A camera according to claim 14, wherein said non-photographing condition is a drum sinking condition.

17. A camera having a projecting device, comprising:
a photographing optical system having a fixed optical frame and a movable optical frame movable relatively with respect to said fixed optical frame, wherein cooperation between said fixed optical frame and said movable optical frame forms a communication bore for optically communicating an outside of said photographing optical system and an interior of said photographing optical system with each other under a photographing condition, and optically closes said communication bore under a non-photographing condition; and
information projecting means arranged on the outside of said photographing optical system, for projecting photographing information into said optical system;
whereby said projection reaches a location on a film through said communication bore under the photographing condition, while said communication bore is optically shielded under the non-photographing condition.

18. A camera according to claim 17, wherein said non-photographing condition is a drum sinking condition.

19. A camera having a data projecting device for projecting data from a side of a front surface of a film, comprising:
a lens drive element for effecting angular movement to positions different from each other upon non-photographing and upon photographing;
a support element for supporting said drive element;
an optical passage provided in said drive element and said support element, for permitting a data luminous flux projected by said data projecting device to pass; and
a light-transmitting portion provided in said drive element, for shielding said optical passage when said drive element is moved angularly to a predetermined position.

20. A camera having a data projecting device for projecting data from a side of a front surface of a film, comprising shielding means for selectively shielding an optical passage for projection of data toward said film responsive to a given camera condition.

21. A camera comprising:
data means for directing data photoing luminous flux toward an image plane;
a taking lens optical system adjustable between a collapsed position for compact storage and a position for photographing;
said optical system comprising at least two barrel members movable relative to one another, each provided with a flux passage opening;
said openings being aligned when the optical system is in the photographing position to unblock data photoing flux and being offset when in the collapsed position to block data photoing flux from reaching said film plane.

22. A camera according to claim 21 wherein said barrel members comprise:
a stationary cylinder having a flux opening;
a cylinder rotatable about said stationary cylinder and having an opening in the form of a notch for unblocking data photoing flux when aligned with said stationary cylinder; and
a lens support cylinder arranged within and movable along a central axis of said stationary cylinder.

23. A camera according to claim 22 further comprising:
a follower means on said lens support cylinder extending through cam means in said stationary cylinder and elongated drive means in said rotatable cylinder;
said cam follower means being moved in an axial direction by said cam means when driven in a circumferential direction by said rotatable cylinder.

24. A camera according to claim 23 wherein said lens supporting cylinder is axially movable between a collapsed position blocking said flux path and a photographing position unblocking said flux path.

* * * * *

UNITED STATES PATENT AND TRADEMARK OFFICE
CERTIFICATE OF CORRECTION

PATENT NO. : 5,345,283
DATED : September 6, 1994
INVENTOR(S) : Kazuhiro Satoh, Minoru Hara and Eiji Otsuka It is certified that error appears in the above-indentified patent and that said Letters Patent is hereby corrected as shown below:

```
Column 2, line 28, change "P" to --P--.
Column 3, line 45, change "O" to --O--.
Column 3, line 46, change "A" to --A--.
Column 3, line 46, change "B" to --B--.
Column 3, line 64, delete "circumferential".
Column 3, line 65, before "that" insert --so--.
Column 4, line 1, before "peripheral" (first occurrence)
         insert --circumferential--.
Column 4, line 7, change "groove" to --grooves--.
Column 4, line 21, change "A" to --A--.
Column 4, line 22, change "B" to --B--.
Column 4, line 46, change "O" to --O--.
Column 6, line 14, change "O" to --O--.
Column 6, line 58, change "P" to --P--.
Column 6, line 62, change "F" to --F--.
Column 7, line 5, change "O" to --O--.
Column 7, line 5, change "B" to --B--.
Column 7, line 19, change "P" to --P--.
Column 7, line 19, change "F" to --F--.
Column 7, line 24, change "F" to --F--.
Column 7, line 26, change "O" to --O--.
Column 7, line 27, change "A" to --A--.
Column 7, line 30, change "A" to --A--.
Column 7, line 54, change "P" to --P--.
Column 7, line 54, change "F" to --F--.
Column 7, line 60, change "A" to --A--.
Column 7, line 66, change "B" to --B--.
```

UNITED STATES PATENT AND TRADEMARK OFFICE
CERTIFICATE OF CORRECTION

PATENT NO. : 5,345,283
DATED : September 6, 1994
INVENTOR(S) : Kazuhiro Satoh, Minoru Hara and Eiji Otsuka It is certified that error appears in the above-indentified patent and that said Letters Patent is hereby corrected as shown below:

```
Column 8, line 1, change "A" to --A--.
Column 8, line 6, change "P" to --P--.
Column 8, line 8, change "F" to --F--.
Column 8, line 13, change "expect" to --except--.
Column 8, line 22 of Claim 1, change "Said Control" to
        --said control--.
```

Signed and Sealed this

Eighteenth Day of July, 1995

*Attest:*

BRUCE LEHMAN

*Attesting Officer*   Commissioner of Patents and Trademarks